United States Patent
Quetglas et al.

(10) Patent No.: US 8,532,705 B2
(45) Date of Patent: Sep. 10, 2013

(54) METHOD AND SYSTEM FOR THE AUTOMATIC CONFIGURATION OF AN APPLIANCE IN A COMMUNICATIONS NETWORK

(75) Inventors: Stephane Quetglas, Marseilles (FR); Philippe Dumay, Marseilles (FR)

(73) Assignee: Gemalto SA, Meudon (FR)

( * ) Notice: Subject to any disclaimer, the term of this patent is extended or adjusted under 35 U.S.C. 154(b) by 708 days.

(21) Appl. No.: 10/970,390

(22) Filed: Oct. 22, 2004

(65) Prior Publication Data

US 2005/0141438 A1  Jun. 30, 2005

(30) Foreign Application Priority Data

Dec. 4, 2003  (FR) ..................................... 03 50971

(51) Int. Cl.
H04B 1/38 (2006.01)
H04M 1/00 (2006.01)
H04L 12/28 (2006.01)

(52) U.S. Cl.
USPC ........................................... 455/558; 370/254

(58) Field of Classification Search
USPC ...................................................... 455/558
See application file for complete search history.

(56) References Cited

U.S. PATENT DOCUMENTS

| | | | | |
|---|---|---|---|---|
| 5,418,837 A * | 5/1995 | Johansson et al. | ............ | 455/558 |
| 5,687,216 A * | 11/1997 | Svensson | ................... | 455/412.2 |
| 5,732,359 A * | 3/1998 | Baranowsky et al. | ..... | 455/552.1 |
| 5,742,509 A * | 4/1998 | Goldberg et al. | ............. | 701/211 |
| 5,881,235 A * | 3/1999 | Mills | .............................. | 709/221 |
| 5,887,253 A * | 3/1999 | O'Neil et al. | .................. | 455/418 |
| 5,896,507 A * | 4/1999 | Martineau | ..................... | 709/216 |
| 5,915,225 A * | 6/1999 | Mills | .............................. | 455/558 |
| 5,923,884 A * | 7/1999 | Peyret et al. | .................. | 717/167 |
| 6,047,071 A * | 4/2000 | Shah | .............................. | 380/273 |
| 6,055,442 A * | 4/2000 | Dietrich | ........................ | 455/558 |
| 6,216,014 B1* | 4/2001 | Proust et al. | ..................... | 455/558 |
| 6,259,934 B1* | 7/2001 | Guerlin | ......................... | 455/566 |
| 6,278,885 B1* | 8/2001 | Hubbe et al. | .................... | 455/558 |
| 6,301,484 B1* | 10/2001 | Rogers et al. | .................. | 455/466 |
| 6,393,297 B1* | 5/2002 | Song | ............................. | 455/466 |
| 6,408,188 B1* | 6/2002 | Park | .............................. | 455/466 |
| 6,415,142 B1* | 7/2002 | Martineau | ..................... | 455/411 |
| 6,415,144 B1* | 7/2002 | Findikli et al. | ................ | 455/419 |
| 6,557,753 B1* | 5/2003 | Beaujard et al. | .............. | 235/375 |
| 6,615,038 B1* | 9/2003 | Moles et al. | .................... | 455/418 |
| 6,615,057 B1* | 9/2003 | Pettersson | ...................... | 455/558 |
| 6,657,956 B1* | 12/2003 | Sigaud | .......................... | 370/230 |
| 6,728,553 B1* | 4/2004 | Lehmus et al. | ............... | 455/558 |
| 6,751,463 B1* | 6/2004 | Lorello et al. | ................. | 455/466 |
| 6,772,952 B1* | 8/2004 | Macaire | ........................ | 235/492 |

(Continued)

OTHER PUBLICATIONS

U.S. Appl. No. 60/515823 of Application US2005/0118991 A1, Oct. 2003.*

*Primary Examiner* — Yuwen Pan
*Assistant Examiner* — Ayodeji Ayotunde
(74) *Attorney, Agent, or Firm* — Buchanan Ingersoll & Rooney PC

(57) ABSTRACT

A method for automatically establishing a configuration of a communication appliance functioning with a subscriber identification card in a communication network. The configuration of the appliance is established via the network, following the detection and communication of its identifier over the network by means of the card. The method includes a preliminary step in which a configuration requirement is detected by means of events or absence of an event stored in the card.

12 Claims, 3 Drawing Sheets

(56) References Cited

U.S. PATENT DOCUMENTS

| | | | |
|---|---|---|---|
| 6,775,725 B1* | 8/2004 | Basquin et al. | 710/100 |
| 6,925,560 B1* | 8/2005 | Basquin | 713/169 |
| 6,947,396 B1* | 9/2005 | Salmi | 370/310 |
| 6,961,587 B1* | 11/2005 | Vilppula et al. | 455/558 |
| 7,031,263 B1* | 4/2006 | Sun et al. | 370/252 |
| 7,047,041 B2* | 5/2006 | Vanska et al. | 455/558 |
| 7,072,672 B1* | 7/2006 | Vanska et al. | 455/456.3 |
| 7,107,009 B2* | 9/2006 | Sairanen et al. | 455/41.1 |
| 7,107,067 B2* | 9/2006 | Tuilier | 455/466 |
| 7,130,622 B2* | 10/2006 | Vanska et al. | 455/419 |
| 7,149,503 B2* | 12/2006 | Aarnio et al. | 455/414.1 |
| 7,191,234 B2* | 3/2007 | Farrugia et al. | 709/227 |
| 7,274,909 B2* | 9/2007 | Perttila et al. | 455/41.2 |
| 7,277,701 B2* | 10/2007 | Almgren | 455/432.3 |
| 7,286,851 B2* | 10/2007 | Nakagomi | 455/558 |
| 7,339,913 B2* | 3/2008 | Chou et al. | 370/338 |
| 2002/0069364 A1* | 6/2002 | Dosch | 713/200 |
| 2003/0046235 A1* | 3/2003 | Lacivita et al. | 705/44 |
| 2003/0119482 A1* | 6/2003 | Girard | 455/411 |
| 2003/0187963 A1* | 10/2003 | Tsai et al. | 709/220 |
| 2003/0204574 A1* | 10/2003 | Kupershmidt | 709/220 |
| 2004/0066756 A1* | 4/2004 | Ahmavaara et al. | 370/328 |
| 2004/0095916 A1* | 5/2004 | Maki et al. | 370/338 |
| 2004/0204089 A1* | 10/2004 | Castrogiovanni et al. | 455/558 |
| 2005/0048948 A1* | 3/2005 | Holland et al. | 455/404.1 |
| 2005/0101309 A1* | 5/2005 | Croome | 455/418 |
| 2005/0105731 A1* | 5/2005 | Basquin | 380/247 |
| 2005/0118991 A1* | 6/2005 | Koganti et al. | 455/419 |
| 2005/0141438 A1* | 6/2005 | Quetglas et al. | 370/254 |
| 2005/0159184 A1* | 7/2005 | Kerner et al. | 455/558 |
| 2005/0176465 A1* | 8/2005 | Fornell | 455/558 |
| 2006/0199613 A1* | 9/2006 | Almgren | 455/558 |
| 2006/0207856 A1* | 9/2006 | Dean et al. | 194/302 |
| 2006/0212482 A1* | 9/2006 | Celik | 707/104.1 |
| 2007/0111703 A1* | 5/2007 | Holland et al. | 455/404.2 |
| 2007/0157294 A1* | 7/2007 | Johnson | 726/4 |
| 2007/0177562 A1* | 8/2007 | Castrogiovanni et al. | 370/338 |

* cited by examiner

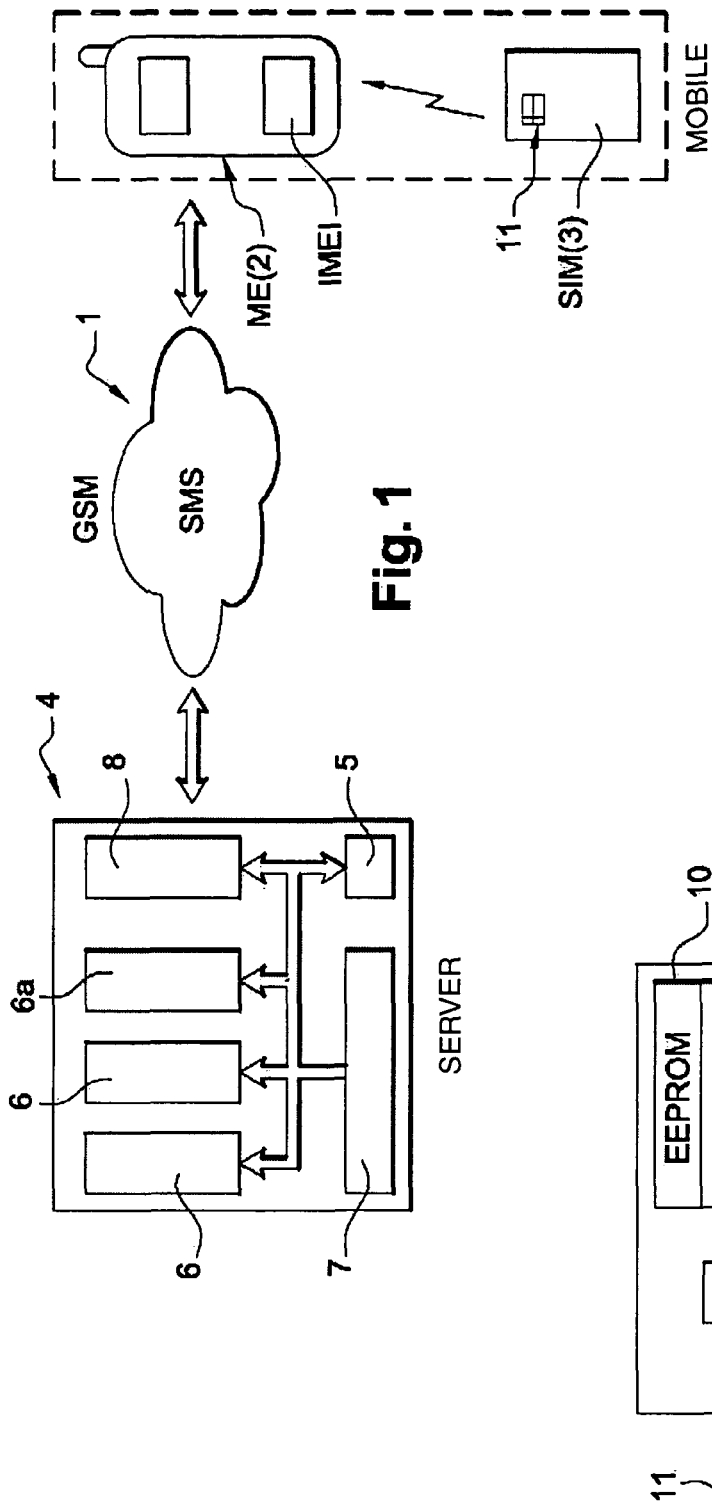

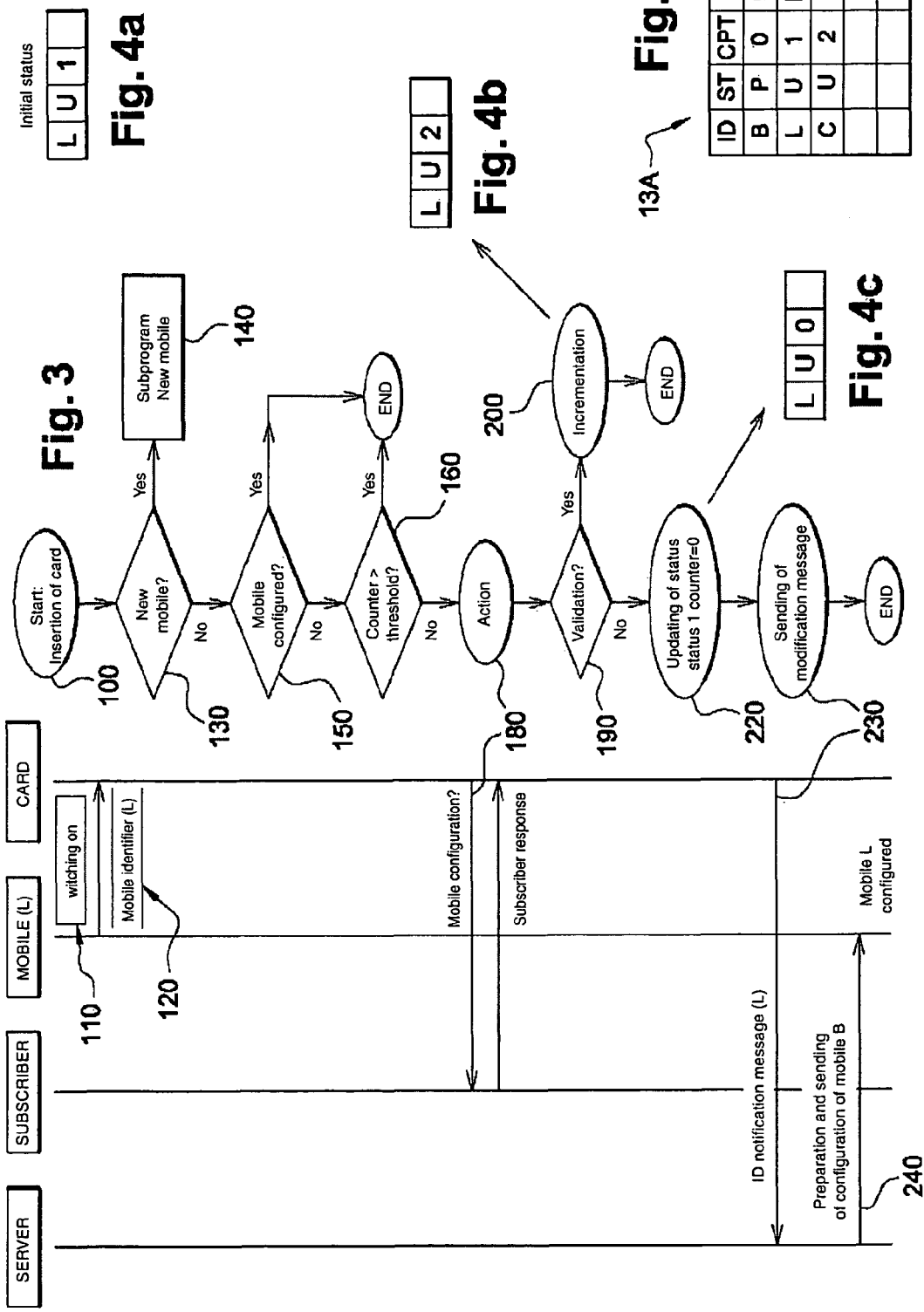

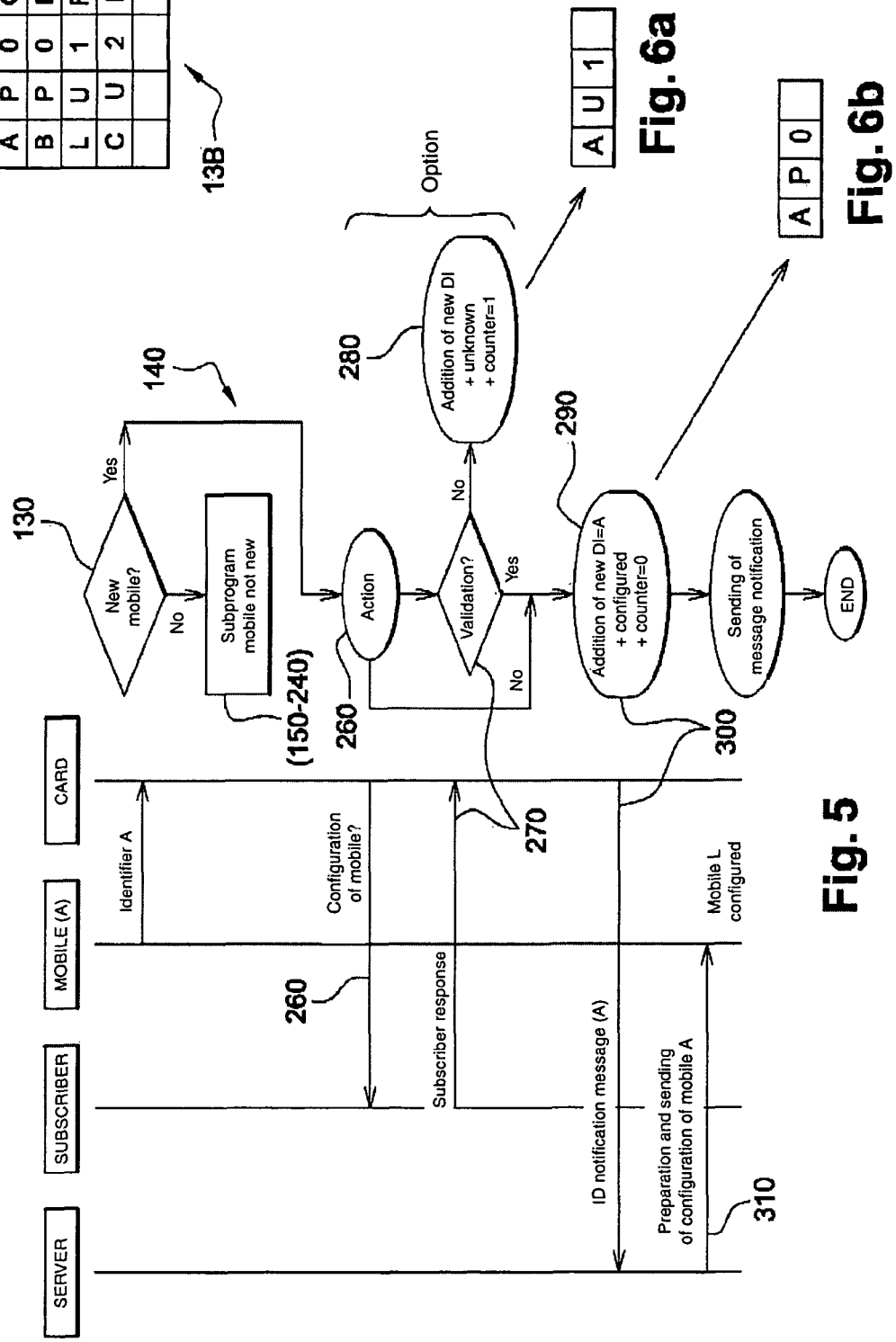

METHOD AND SYSTEM FOR THE AUTOMATIC CONFIGURATION OF AN APPLIANCE IN A COMMUNICATIONS NETWORK

This disclosure is based upon French Application No. 0350971, filed on Dec. 4, 2003, the contents of which are incorporated herein by reference.

BACKGROUND OF THE INVENTION

The invention concerns the field of wireless communications networks, in particular of the GSM type, the acronym for the English expression "Global System for Mobile Communication".

It relates more particularly to a method and system for the automatic configuration of mobile appliances in networks using a subscriber identification card known as a SIM or U(SIM), the acronym for the English expression "Universal (Subscriber Identity Module)".

At the present time access to complex data of the multimedia, photo, video or audio type via various communication media, protocols or services such as WAP, MMS, GPRS, e-mail, SyncML, etc, requires a prior configuration of the mobile appliances by means of many complex parameters.

There exist various ways set out below of configuring a module. There exists in particular a preconfiguration carried out by the manufacturer in the factory or a more or less manual configuration carried out by the subscriber with the help of a customer service.

The configurations can be carried out step by step with oral explanations from a customer service or following a request from the subscriber on the Internet for a configuration requirement giving rise to an automatic configuration by short messages of the SMS type or making available a description of the operations to be carried out on an Internet site.

These operations being relatively lengthy and complex for the user, the assignee recently presented an automatic appliance configuration method in its offer entitled "GemConnect Device Manager", which consists, each time the SIM card is inserted in an appliance, of offering to the user a configuration of his appliance; in the case of acceptance, the configuration is carried out automatically via the network.

However, at the present time, when the user has several appliances, or he changes locations frequently, in particular changing countries with different network coverage and the operator at that place does not offer the best services and/or accesses, the user does not know which appliances support the services permitted by his appliance and his subscription and whether it is necessary to effect or re-effect a configuration for optimum functioning.

Since exchanges between the mobile appliances and the card and the network are not standardized, it is not possible at the present time to interrogate the mobile in order to know whether it has been configured and in what manner.

SUMMARY OF THE INVENTION

The invention aims to allow configuration of a mobile appliance as quickly as possible and judiciously, even when the user has several mobile appliances which he uses frequently with the same card.

The principle of the invention resides, according to a preferred embodiment, in an application program which is able to carry out suitable tests for analyzing and detecting a configuration defect or requirement in the appliance with respect to information previously collected and stored.

The configuration defect or requirement may also be detected according to an absence of indication or event listed and/or according to events or criteria detected such as geographical location where the appliance is situated, preferences, requirements, user, etc.

Thus, according to one embodiment, the object of the invention is a method for automatically establishing a configuration of a communication appliance functioning with a subscriber identification card in a communication network, in which the configuration of the appliance is established via the network, following the detection and communication of its identifier on the network by means of the card.

It is distinguished in that it comprises a prior step according to which a configuration requirement is detected by means of events or the absence of events stored in the card.

To this end, the method comprises at least one test step of determining that at least one of the following conditions is fulfilled:

a) the current appliance has already been identified by the card,
b) the appliance is already configured,
c) a maximum number of configuration actions with the user has been reached.

It also includes the following characteristics:
test b) consists of determining whether the appliance has already been configured in relation or not to a given context;
the context comprises an indication of the network which has been used and/or the geographical place in which the appliance was situated and/or the type of network technology and/or the network operator. Thus the configuration requirement may be detected according to indications (or absence of indication) relating to the type of network technology, and/or network operator, and/or a criterion;
there is first listed in a memory area each identifier for an appliance with which the card has been put in relationship as well as events related to the configuration of each appliance from a group of the following events:
appliance configured or not,
number of configuration actions,
context of the configuration.

In operation, when the mobile appliance is switched on, the application requires an identifier for the appliance and compares the value of the identifier with a list of appliance identifiers known previously and listed. When a specific condition is fulfilled, the application transmits a notification message containing the appliance identifier to a predetermined server.

The server is capable of analyzing the value of the identifier so as to determine its model and type. This information is used for assessing the highest capacities of the appliance, such as the protocol supported for a remote configuration, the services available (electronic messaging "e-mail", multimedia MMS, WAP browser, etc), an itinerancy situation for offering the best possible services.

Another object of the invention is a wireless communication network system for communication appliances comprising a server for the automatic configuration of the appliances via the network. The system is distinguished in that it comprises:
at least one memory area listing identifiers for appliances with which the card has been put in relationship as well as events related to the configuration of each appliance,
at least one application able to list the events and to detect the configuration requirement according to these events.

Another object of the invention is a subscriber identification card able to cooperate with a mobile communication appliance in order to allow a communication service in a communication network.

It is distinguished in that it comprises an application able to list events relating to a configuration of each appliance with which it is put in relationship and to detect a configuration requirement for the appliance according to these events or absence of events stored by the application.

In particular, the card is able to list all kinds of information relating to the configuration or various contexts of the configuration such as the type of network technology, the network operator; likewise it can list information sent by the card or by the user such as information on the fact that the appliance is configured or not, the number of configuration actions, acceptances or refusals in respect of the user, his configuration preferences etc.

BRIEF DESCRIPTION OF THE DRAWINGS

An example embodiment of the invention will be described in relation to the following figures:

FIG. 1 is a diagram illustrating the communication network system used by the invention;

FIG. 2 is a diagram of a SIM chip card structure used by the invention;

FIG. 3 is a diagram illustrating the configuration method according to the invention in the case of a known mobile;

FIG. 4 is a diagram of a mobile status table relating to the configuration;

FIG. 5 is a diagram illustrating the configuration method according to the invention in the case of a new mobile;

FIG. 6 is a diagram of a mobile status table relating to the configuration in the case of a new mobile;

FIGS. 4a, 4b, 4c, 6a, 6b illustrate the various changes in the values in the status table.

DETAILED DESCRIPTION

In FIG. 1, the invention uses a communication network system 1 for cellular communication appliances 2, referred to as a mobile ME hereinafter and functioning with a subscriber identification card 3 referred to as a SIM or (U)SIM.

Each mobile comprises an identifier IMEI stored in a memory of the mobile. There may be several networks and may have various characteristics. They may comprise in particular a network of the GSM, GPRS, UMTS, WLAN etc type.

The network may convey sophisticated multimedia data of the MMS type, or video or audio streams.

The system in the example comprises a configuration server 4 connected to the telecommunication network by a short message channel SMS. This server 4 comprises in particular:

means 5 for receiving mobile identifiers transmitted in particular at the request of the SIM card, an identifier base 6 indicating the capacities of the mobiles, a database 6a relating to the subscription taken out by the user indicating in particular the services to which he is entitled, a configuration profile base 6b, processing means 7 able to identify the necessary or optimum configuration corresponding to each identifier in response to the reception of a configuration request notification sent in particular at the initiative of the card, transmission means 8 able to transmit configuration instructions from the mobile determined by the processing means 7 in response to the reception of a notification containing an identifier IMEI, mobile interfaces 9 or adaptors supporting standard or proprietary protocols such as smart messaging™, WAPT™, WLAN or others, making it possible to communicate according to the specificities of the mobile.

The system comprises a memory area 10 intended to list events related to the configuration of the mobiles which will be seen later. This area 10 is preferably in a chip 11 of the card 3 for convenience, as in the example (FIG. 2).

The appliances 2 of the subscriber may be several in number, whether the subscriber switches around the appliances during subscription or replaces them with new ones. Where applicable, the subscriber may insert his card 3 into the mobile of a third party or borrow one of his mobiles.

The electronic chip 11 of the subscriber identification card comprises, in a known manner, a processor connected via a data and control bus to a program memory ROM comprising in particular an operating system for the card and specific algorithms, to a programmable memory 12 and to a random access memory RAM.

The programmable memory 12, in particular of the EEPROM type, comprises in particular data relating to the subscriber or data relating to his subscription with his associated enciphering key (IMSI, Ki) for authorising a communication service and specific applications 12, 13. The card is able to cooperate with a mobile, which may for example be a telephone, a personal assistant PDA, a portable computer or other appliance provided with a communication function and interface.

According to one characteristic, the card comprises an application program 12, referred to as an application, stored in its programmable memory and which is capable of detecting a configuration requirement on the mobile in which it is situated. The application may for example be of the SIM toolkit type, which means that it uses sets of commands in accordance with the recommendation GSM 11.14 enabling the card to be "proactive" in that it takes initiatives for directing in particular the mobile. During the execution of the program by the card processor, the card obtains from the mobile the sending of a message containing its identifying code IMEI. In the example, the card has itself taken over the exchanges with the mobile.

According to one characteristic, the application 12 lists in the memory area and firstly a history of the following events relating to the configuration of the mobile. The memory area comprises a table 13 (FIG. 4), or FIFO register comprising at the head of the column events (ST, CPT, Z . . . ) and at the head of the row identifiers (A, B, L, C . . . ) for appliances of the subscriber.

The events listed in the example comprise in particular the state, configured (P) or not (U) of the mobile, the number of configuration actions (CPT) with the subscriber, the context of the configuration (Z). For the latter, it may be a case of a geographical area in which the mobile is situated at the time of configuration, etc.

Any other context or environment may be taken into account by the invention, in particular the type of technology of the network (WLAN, GPRS etc), the network operator, the version of the configuration, the date etc.

The events will be taken into account subsequently in the context of the implementation of the method of the invention in relation to FIGS. 3 and 5 for a known mobile L and a new mobile A both possessing a WAP browser.

In FIG. 3, the method of the invention comprises the following steps and interactions performed between the entities of the server system, subscriber, mobile and card represented diagrammatically by vertical lines.

When a communication appliance or mobile "L" comprising a subscriber identification card SIM, (U)SIM, which has just been inserted or reinserted, is switched on 110, it establishes a standard start-up procedure (not described).

Next the method of the invention implements a preliminary step according to which the configuration requirement is detected.

For this purpose, when the card has recovered 120 the value (L) of the mobile identifier and before transmitting it over the network or before seeking the agreement of the subscriber, a first comparative test 130 is carried out in order to know whether the mobile is a new mobile for the card.

To this end, the test consists of seeking the presence of the value (L) in the table 13 A. In FIG. 4*a*, there are the initial values U and 1 associated with the mobile L. They mean respectively that the mobile L has not been configured and that the user has already once refused its configuration.

If the search is fruitless, the subprogram 140 in FIG. 5 is passed to.

In the contrary case, mobile known to the card, the program leads to a second test 150 consisting of determining the status of the mobile. In this case, it is determined whether the mobile has already been configured. The test consists of reading the value (P) or (U) corresponding to the value (L).

If the value indicates that the mobile has already been configured, the program stops and the subscriber uses the mobile normally without loss of time and without further acting on the network server.

On the other hand, if the value indicates the absence of configuration of the mobile (the no branch), this is interpreted as a configuration requirement and the program switches to a third test 160 consisting of determining whether the number of automatic configuration actions on the mobile previously carried out on the user is below a given threshold, "3" for example.

To this end, the card comprises a memory area comprising a counter, represented in the example by a field CPT in the table containing a value representing the number of actions.

If the action counter is above a threshold, then the program is ended and in this way it is avoided acting excessively on the user for a configuration which he does not in principle require.

If the counter does not exceed the threshold, the user is prompted at step 180 by a display on the screen of the mobile. The subscriber responds and at step 190 a validation is carried out: in the event of refusal, the action counter is incremented to 2 at step 200 (FIG. 4*b*) before ending the program.

In the case of acceptance of the automatic configuration, the program passes to step 220 and updates the configuration state column by indicating by "P" that the mobile will be configured and by "0" in the CPT column (FIG. 4*c*).

Subsequently, the card sends a notification message 230 with the identifier of the mobile (L) over the network in order to have an automatic configuration.

At step 240, from the identifier of the mobile, the server prepares the configuration parameters of the WAP browser and formats them using the remote configuration protocol supported by the mobile L:

home page: wap.home.com
IP address of the WAP gateway: 123.456.123.456
WAP gateway port: 4201
WAP gateway user identifier: wap
WAP gateway password: wap
name of GPRS access point: apn.gprs.wap The mobile L receives the parameters and stores them in its memory in order to configure the WAP browser after confirmation by the subscriber. The configuration program is then ended and the subscriber can use the browser to access WAP sites.

The updating of the state table can also take place after the configuration has been completed successfully.

On the other hand, when the first test 130 is positive, that is to say a new mobile has been detected, the program switches to the subprogram 140 which is the object of FIG. 5.

In a preferred option of the method, at step 260 the subprogram first seeks the agreement of the user for the configuration, and recovers his response.

At step 270, the program proceeds with a test for determining whether or not the subscriber accepts the configuration and, in the case of acceptance, the program adds the new identifier A to the table 13*b*, indicates the configured state "P" and sets the counter of fruitless actions to zero.

On the other hand, in the case refusal of the subscriber for the configuration, the program proceeds at step 280 with the addition of the new identifier in the table, indicates the non-configured state "U" and sets the fruitless actions counter to "1" (FIG. 6*a*).

According to a preferred option of the method, the opinion of the user is not requested and the configuration takes place unknown to him and transparently.

The program then passes to step 290 and directly adds the identifier A of the mobile to the table 13*b*, updates its state by marking "P" and indicates a number of fruitless actions equal to zero (FIG. 6).

Next, at step 300, the notification message is sent to the server in order to effect the configuration as before.

Other columns can be added in order to mention therein parameters such as those relating to the context of the configuration. Columns may comprise for example an indication of geographical area (country GB, FR, other region), the type of network technology (WLAN, GPRS etc), the network operator, the version of the configuration, the date etc.

Thus, for example, WLAN, GPRS or UMTS networks of the operators may be required in the geographical area in which the mobile is situated. Likewise services may be accessible in one geographical area and not in others.

The data relating to the configuration, in particular the context, may be used by the card or transmitted to the server in order to be analyzed therein and to trigger a specific action making it possible to serve the subscriber better.

The invention finds another advantage in the configuration of an appliance according to directives or criteria chosen by the subscriber.

For example, the subscriber chooses a type of network technology, or a new operator, and obtains an optimised configuration. The configuration proposal, or directly the configuration, may be effected according to the place where the appliance which is automatically detected by the network is situated. Conversely, the subscriber may obtain from the server an indication of geographical place in which he must be situated in order to satisfy optimised use according to his choice.

In operation, it suffices for the application program of FIGS. 3 and 5 to comprise a start-up step triggered not by the insertion of the card but by an instruction or selection by the subscriber in a menu of the appliance comprising a choice of technologies and/or operators or others. The program of the invention will seek, amongst the events stored, whether the appliance has already been configured according to a given context but also according to a given criterion before effecting or proposing automatic configuration.

The invention claimed is:

1. A method for automatically establishing a configuration of a communication appliance over a wireless network, the communication appliance having a removable subscriber identification card, the method comprising:
    detecting, by the removable card, an identifier of the communication appliance;
    determining, by the removable card, a configuration requirement for the communication appliance, based on the detection;
        said determining of a configuration requirement for the communication appliance including determining, by the removable card, whether the communication appliance has previously been identified by the removable card;
    establishing a communication between the removable card and a server to send the appliance identifier over the network to the server, based on a result of the determination; and
    in response to receipt of the appliance identifier at the server, establishing a communication between the communication appliance and the server using the appliance identifier to configure the communication appliance over the network.

2. The method according to claim 1, wherein determining the configuration requirement further comprises at least one test step of determining whether:
    a) the communication appliance is already configured; and
    b) a maximum number of configuration actions with a user has been reached.

3. The method according to claim 2, wherein the test step a) comprises determining whether the communication appliance has already been configured in relation to a given context.

4. The method according to claim 3, wherein said context comprises at least one of an indication of a wireless network which has already been used by the communication appliance, a geographical place in which the communication appliance was situated during a prior use of the communication appliance, a type of network technology which has already been used by the communication appliance, and an operator of the wireless network which has already been used by the communication appliance.

5. The method according to claim 1 further comprising:
    listing, in a memory area of the removable card, each identifier of a communication appliance with which the card has been put in relationship and at least one respective event related to a configuration of each communication appliance, wherein the at least one event includes at least one of:
    whether a respective communication appliance has been configured or not;
    a number of configuration actions; and
    a configuration context.

6. The method according to claim 2, wherein a memory area of the removable card stores at least one event and a processor of the removable card carries out the at least one test step.

7. A wireless communication network system for a plurality of communication appliances, each communication appliance having a removable subscriber identification card, the system comprising:
    a server for configuring the plurality of communication appliances via the wireless network,
    wherein each removable subscriber identification card includes:
        at least one memory area listing an identifier for at least one respective communication appliance with which each subscriber identification card has been put in relationship; and
        a processor executing at least one application for determining a configuration requirement relating to at least one configuration of the respective communication appliance, wherein the determination of the configuration requirement for the communication appliance includes determining whether the communication appliance has previously been identified by the removable card, and communicating the identifier for a respective appliance to the server based on the determination,
    wherein based on the communication by the processor of a respective subscriber identification card, the server establishes a communication with the respective communication appliance for configuration over the wireless network.

8. A removable subscriber identification card for cooperating with and configuring a mobile communication appliance, wherein the subscriber identification card is put into relationship with the mobile communication appliance for establishing communication service with a communication network, the card comprising:
    a memory for storing program code of an application program related to a configuration of at least one communication appliance;
    a processor for executing the program code of the application program related to the configuration of the mobile communication appliance in which the card has been put in relationship, determining a configuration requirement for the mobile communication appliance, said determining of the configuration requirement for the mobile communication appliance including the card determining whether the appliance has previously been identified by the processor, and communicating an identifier of the mobile communication appliance to a server on the communication network, based on the determination, to enable the server to establish a communication with the mobile communication appliance for configuring the mobile communication appliance over the communication network.

9. The subscriber identification card according to claim 8, wherein the memory area stores an identifier for the mobile communication appliance with which the card has been put in relationship and at least one respective event related to a configuration of the mobile communication appliance, wherein the at least one respective event includes at least one of:
    whether the mobile communication appliance has been configured or not;
    a number of configuration actions; and
    a configuration context.

10. The subscriber identification card according to claim 8, wherein the configuration requirement is further determined according to at least one indication, the at least one indication including at least one of:
    a type of network technology which has already been used by the mobile communication appliance; and
    an operator of the wireless network which has already been used by the mobile communication appliance.

11. The method according to claim 1, wherein a communication is established between the communication appliance and the server based on a remote configuration protocol supported by the communication appliance.

12. The system of claim 7, wherein a communication between the server and the respective communication appliance is established based on a remote configuration protocol supported by the communication appliance.

* * * * *